(12) United States Patent
Shiraishi

(10) Patent No.: US 12,008,074 B2
(45) Date of Patent: Jun. 11, 2024

(54) LEARNING DEVICE, LEARNING METHOD AND STORAGE MEDIUM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 360 days.

(21) Appl. No.: 17/622,935

(22) PCT Filed: Jul. 5, 2019

(86) PCT No.: PCT/JP2019/026849
§ 371 (c)(1),
(2) Date: Dec. 27, 2021

(87) PCT Pub. No.: WO2021/005653
PCT Pub. Date: Jan. 14, 2021

(65) Prior Publication Data
US 2022/0245399 A1    Aug. 4, 2022

(51) Int. Cl.
*G06F 18/21* (2023.01)
*G06F 18/214* (2023.01)
*G06F 18/2413* (2023.01)

(52) U.S. Cl.
CPC ........ *G06F 18/214* (2023.01); *G06F 18/2413* (2023.01)

(58) Field of Classification Search
CPC ... G06F 18/214; G06F 18/2413; G06V 10/70; G06N 3/08; G06T 7/00
(Continued)

(56) References Cited

U.S. PATENT DOCUMENTS 11,556,746 B1 *  1/2023  Dasgupta ................. G06N 5/04
2012/0039541 A1 * 2/2012  Fukui ................ G06F 18/24323
                                                              382/224
(Continued)

FOREIGN PATENT DOCUMENTS

JP   2010-224922 A   10/2010
JP   2014-115920 A    6/2014
(Continued)

OTHER PUBLICATIONS

International Search Report for PCT Application No. PCT/JP2019/026849, dated Oct. 1, 2019.
(Continued)

*Primary Examiner* — Neil R McLean
(74) *Attorney, Agent, or Firm* — Sughrue Mion, PLLC

(57) ABSTRACT

A learning device is configured to acquire first training data that is training data regarding a registered category object and second training data regarding an unregistered category object, the registered category object belonging to a registered category which is registered as an identification target, the unregistered category object not belonging to the registered category. The learning device is also configured to calculate, on a basis of the first training data and the second training data, an identification score indicating a degree of certainty that an object to be identified belongs to the registered category. The learning device is also configured to calculate, on a basis of the second training data, an unregistered score indicating a degree of certainty that the object to be identified does not belong to the registered category. The learning device is also configured to learn an identification model which performs an identification regarding the registered category based on the identification score and the unregistered score.

10 Claims, 6 Drawing Sheets

(58) Field of Classification Search
USPC .......................................................... 382/159
See application file for complete search history.

(56) References Cited

U.S. PATENT DOCUMENTS

| | | | |
|---|---|---|---|
| 2014/0198980 A1 | 7/2014 | Fukui et al. | |
| 2017/0124397 A1* | 5/2017 | Fujimori | H04N 1/00164 |
| 2018/0089531 A1 | 3/2018 | Geva et al. | |

FOREIGN PATENT DOCUMENTS

| | | |
|---|---|---|
| JP | 2014-135014 A | 7/2014 |
| JP | 2016-062249 A | 4/2016 |
| JP | 2018-526711 A | 9/2018 |

OTHER PUBLICATIONS

Simonyan et al., "Very Deep Convolutional Networks for Large-Scale Image Recognition", Published as a conference paper at ICLR 2015, pp. 1-14.

* cited by examiner

FIG. 2A

```
┌─────────────────────────────────────┐
│         FIRST TRAINING DATA         │
│                                     │
│   ┌─────────────────────────────┐   │
│   │  REGISTERED CATEGORY IMAGE  │   │
│   └─────────────────────────────┘   │
│                                     │
│   ┌─────────────────────────────┐   │
│   │      LABEL INFORMATION      │   │
│   └─────────────────────────────┘   │
└─────────────────────────────────────┘
```

FIG. 2B

| REGISTERED CATEGORY IMAGE | CATEGORY |
|---|---|
| 🍎 | APPLE |
| 🍊 | ORANGE |
| 🍎 | APPLE |
| ⋮ | ⋮ |
| 🍊 | ORANGE |

| UNREGISTERED CATEGORY IMAGE | CATEGORY |
|---|---|
| ⚽ | — |
| 🍔 | — |
| ⚙ | — |
| ⋮ | ⋮ |
| 🌷 | — |

LEARNING DEVICE, LEARNING METHOD AND STORAGE MEDIUM

This application is a National Stage Entry of PCT/JP2019/026849 filed on Jul. 5, 2019, the contents of all of which are incorporated herein by reference, in their entirety.

TECHNICAL FIELD

The present invention relates to a learning device for performing learning relating to object recognition, a learning method, and a storage medium for storing a program relating to learning.

BACKGROUND ART

Object recognition techniques for recognizing an object in the image acquired by an imaging device such as a camera is known. For example, Non-Patent Literature 1 describes an object recognition technique for performing learning and identification using a multilayer neural network.

In the learning in the object recognition technique described in Non-patent Literature 1, a display image of an object which belongs to any one of categories (registration categories) registered in advance is inputted as an identification target to a predetermined identification model, and the learning of the identification model is performed so as to increase the identification score of the category to which the object belongs. After the learning of the identification model, when a display image of the object whose category is unknown is inputted to the above-described learned identification model, the identification score for each of the registered categories is outputted from the above-described identification model. In addition, Non-Patent Literature 1 also describes a reject process for rejecting the identification result in a case where the identification score is smaller than a predetermined threshold value for the reason that no object which belongs to any of the registered categories can be detected.

PRIOR ART DOCUMENTS

Non-Patent Literature

Non-Patent Literature 1: Karen Simonyan, and Andrew Zisserman, "Very Deep Convolutional Networks for Large-Scale Image Recognition" ICLR, 2015.

SUMMARY OF THE INVENTION

Problem to be Solved by the Invention

According to the object recognition technique described in Non-Patent Literature 1, at the time of the learning, the training of the identification model is performed by use of only display images of objects (referred to as "registered category objects") belonging to any of the registration categories. On the other hand, at the time of identification, not only a display image of a registered category object but also a display image of an object (referred to as "unregistered category object") not belonging to any of the registered categories can be inputted. At this time, there is a case where the identification score for the unregistered category object is higher than that for the registered category object. In this case, in the above-mentioned reject process, it is impossible to reject the identification result for the unregistered category object while outputting, without rejecting, the identification result for the registered category object.

In view of the above-described issues, it is therefore an example object of the present disclosure to provide a learning device, a learning method, and a storage medium for storing a program relating to learning that can suitably execute learning relating to object recognition.

Means for Solving the Problem

In one mode of the learning device, there is provided a learning device including: a training data acquisition unit configured to acquire first training data that is training data regarding a registered category object and second training data regarding an unregistered category object, the registered category object belonging to a registered category which is registered as an identification target, the unregistered category object not belonging to the registered category; an identification score calculation unit configured to calculate, on a basis of the first training data and the second training data, an identification score indicating a degree of certainty that an object to be identified belongs to the registered category; an unregistered score calculation unit configured to calculate, on a basis of the second training data, an unregistered score indicating a degree of certainty that the object to be identified does not belong to the registered category; and a learning unit configured to learn an identification model which performs an identification regarding the registered category based on the identification score and the unregistered score.

In one mode of the learning method, there is provided a learning method including: acquiring first training data that is training data regarding a registered category object and second training data regarding an unregistered category object, the registered category object belonging to a registered category which is registered as an identification target, the unregistered category object not belonging to the registered category; calculating, on a basis of the first training data and the second training data, an identification score indicating a degree of certainty that an object to be identified belongs to the registered category; calculating, on a basis of the second training data, an unregistered score indicating a degree of certainty that the object to be identified does not belong to the registered category; and learning an identification model which performs an identification regarding the registered category based on the identification score and the unregistered score.

In one mode of the storage medium, there is provided a storage medium storing a program executed by a computer, the program causing the computer to function as: a training data acquisition unit configured to acquire first training data that is training data regarding a registered category object and second training data regarding an unregistered category object, the registered category object belonging to a registered category which is registered as an identification target, the unregistered category object not belonging to the registered category; an identification score calculation unit configured to calculate, on a basis of the first training data and the second training data, an identification score indicating a degree of certainty that an object to be identified belongs to the registered category; an unregistered score calculation unit configured to calculate, on a basis of the second training data, an unregistered score indicating a degree of certainty that the object to be identified does not belong to the registered category; and a learning unit configured to learn an identification model which performs an identification regarding the registered category based on the identification score and the unregistered score.

Effect of the Invention

An example advantage according to the present invention is to suitably perform learning of an identification model for performing identification relating to the registered categories by using both the identification score and the unregistered score.

BRIEF DESCRIPTION OF THE DRAWINGS

FIG. 2A illustrates an example of the data structure of first training data.

FIG. 2B illustrates an example of the correspondence between the registered category image and the category indicated by the corresponding label information.

DESCRIPTION OF EXAMPLE EMBODIMENTS

Hereinafter, example embodiments of a learning device, a learning method, and a storage medium will be described with reference to the drawings.

First Example Embodiment (1) Overall Configuration

Figure 1:
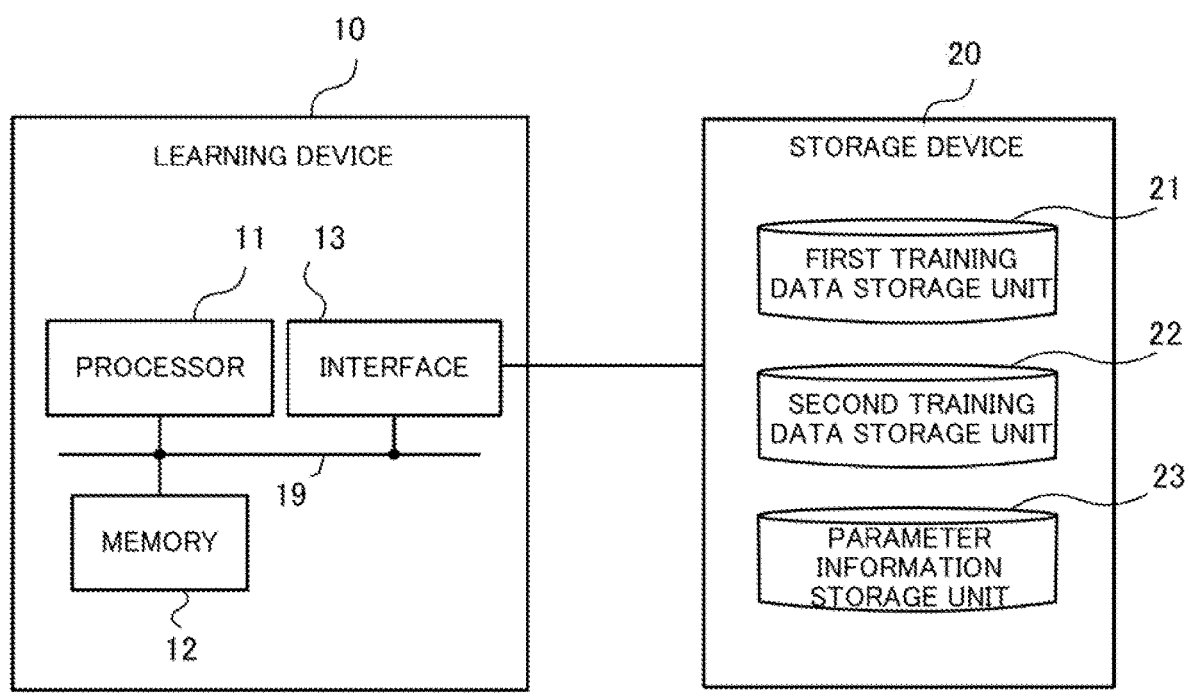
FIG. 1 illustrates a schematic configuration of a learning system according to a first example embodiment.

FIG. 1 shows a schematic configuration of a learning system 100 according to a first example embodiment. The learning system 100 suitably executes the learning of a learning model that performs identification of an object displayed in an image. The learning system 100 includes a learning device 10 and a storage device 20.

The learning device 10 performs the learning of an identification model relating to identification of an object displayed in an image. Here, the identification model is learned, for example, to output information to the input image to identify the pre-registered category to which the object displayed on the image belongs. Hereafter, pre-registered categories to be identified target are referred to as "registered categories" and the learned identification model is referred to as "identifier".

The storage device 20 is a device in which the learning device 10 can refer to and write data, and includes a first training data storage unit 21, a second training data storage unit 22, and a parameter information storage unit 23. The storage device 20 may be an external storage device such as a hard disk connected to or built in to the learning device 10, or may be a storage medium such as a flash memory, or may be a server device that performs data communication with the learning device 10. Further, the storage device 20 may be configured by a plurality of storage devices and hold the storage units described above in a dispersed way.

The first training data storage unit 21 stores one or plural set of training data (also referred to as "first training data") that is a combination of an image on which an object (also referred to as a "registered category object") belonging to a registered category is displayed and label information indicating the registered category to which the above-mentioned registered category object belongs. The image of the first training data may be a RGB image, or may be an infrared image obtained by an infrared camera, or may be a depth image or point cloud information obtained from a range measurement sensor or the like capable of measuring a distance, or may be a feature vector representing appearance or characteristics other than them.

FIG. 2A shows an example of the data structure of the first training data. As shown in FIG. 2A, the first training data includes a registered category image, which is an image representing a registered category object, and label information, which indicates the category (i.e., correct-answer category) of the registered category object displayed in the corresponding registered category image. The label information may further include information indicating the position of the registered category object, which corresponds to the correct-answer category indicated by the label information, in the registered category image.

FIG. 2B shows an example of the correspondence between the registered category image and the correct-answer category indicated by the corresponding label information. FIG. 2B illustrates sets of the registered category images and corresponding correct-answer categories indicated by the label information in a case where the registered categories are "APPLE" and "ORANGE". The registered category image may include a plurality of registered category objects. In this case, for example, the label information associated with the registered category image includes information indicating the position and the category with respect to each of the registered category objects. The first training data shown in FIGS. 2A and 2B is an example and is not limited thereto.

The second training data storage unit 22 stores one or plural set of training data (also referred to as "second training data") that is an image in which object(s) (also referred to as "unregistered category object(s)") not belonging to the registered category are displayed. The image serving as the second training data may be a RGB image, or may be an infrared image obtained by an infrared camera, or may be a depth image or point cloud information obtained from a range measurement sensor capable of measuring a distance, or may be a feature vector representing appearance or characteristics other than them.

Figures 3A, 3B:
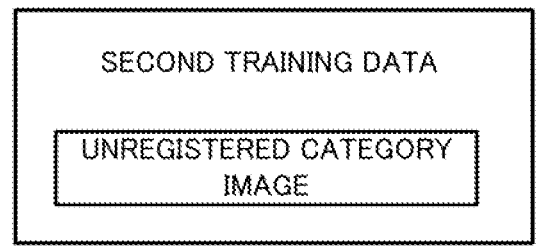
FIG. 3A illustrates an example of the data structure of second training data.
FIG. 3B illustrates an example of the correspondence between the unregistered category image and the corresponding category.

FIG. 3A shows an example of the data structure of the second training data. As shown in FIG. 3A, the second training data includes at least an unregistered category image in which an unregistered category object appears. The second training data may further include position information regarding the unregistered category object in the unregistered category image.

FIG. 3B shows an example of the correspondence between the unregistered category image and the corresponding category. In FIG. 3B, when the registered categories are "APPLE" and "ORANGE", the corresponding unregistered category images display objects "SOCCER BALL", "HAMBURGER", "GEAR", and "FLOWER" which belong to categories other than "APPLE" and "ORANGE" and which are not associated with any of the registered categories. The second training data shown in FIGS. 3A and 3B is an example and is not limited thereto.

The parameter information storage unit 23 stores information relating to parameters necessary for causing the identification model learned by the learning device 10 to function as an identifier. The identification model may be a learning model based on a neural network, or may be another type of learning model such as a support vector machine, or may be a learning model combining them. For example, when the identification model has a neural network-based configuration, the parameter information storage unit 23 includes information indicative of various parameters regarding the layer structure of the identification model, the neuron structure of each layer, the number of filters and the filter size in each layer, and the weight of each element of each filter.

(2) Hardware Configuration of Learning Device

Next, the hardware configuration of the learning device 10 will be described with reference to FIG. 1. The learning device 10 includes, as hardware, a processor 11, a memory 12, and an interface 13. The processor 11, memory 12, and interface 13 are connected to one another via a data bus 19.

The processor 11 executes a predetermined process by executing a program stored in the memory 12. The processor 11 is a processor such as a CPU (Central Processing Unit) and a GPU (Graphics Processing Unit).

The memory 12 is configured by various memories such as a RAM (Random Access Memory), a ROM (Read Only Memory), and a flash memory. The memory 12 stores a program for executing a process related to learning executed by the learning device 10. The memory 12 is used as a work memory and temporarily stores information acquired from the storage device 20. The memory 12 may function as the storage device 20 or a part of the storage device 20. In this case, the memory 12 may store at least one of the first training data storage unit 21, the second training data storage unit 22, and the parameter information storage unit 23 instead of the storage device 20 storing all of them. Similarly, the storage device 20 may function as a memory 12 of the learning device 10.

The interface 13 is a communication interface for wired or wireless transmission and reception of data to and from the storage device 20 under the control of the processor 11, and includes a network adapter and the like. The learning device 10 and the storage device 20 may be connected by a cable or the like. In this case, the interface 13 is a communication interface for performing data communication with the storage device 20, or another interface that conforms to a USB, a SATA (Serial AT Attachment, and the like for exchanging data with the storage device 20.

The hardware configuration of the learning device 10 is not limited to the configuration shown in FIG. 1. For example, the learning device 10 may further include a display unit such as a display, an input unit such as a keyboard or a mouse, a sound output unit such as a speaker, and the like.

Further, the learning device 10 may be configured by a plurality of devices. In this case, each of these devices transmits and receives information necessary for each device to perform a pre-allocated processing among the devices.

(3) Learning Details

Next, details of processing related to learning performed by the learning device 10 will be described.

(3-1) Functional Block

Figure 4:
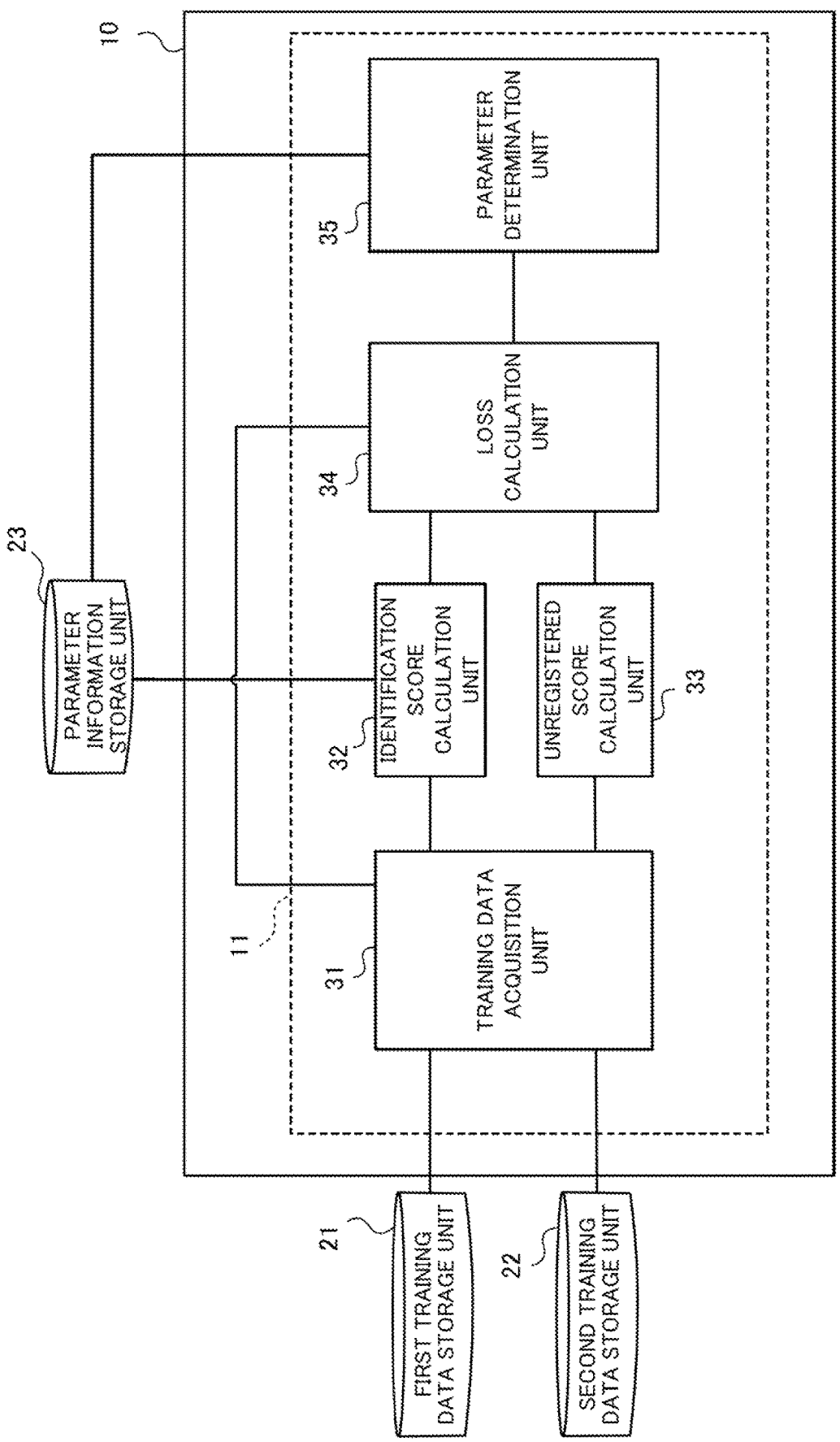
FIG. 4 illustrates an example of a block diagram showing a functional configuration of the learning device.

FIG. 4 is an example of a block diagram illustrating a functional configuration of the learning device 10. As shown in FIG. 4, the processor 11 of the learning device 10 includes a training data acquisition unit 31, an identification score calculation unit 32, an unregistered score calculation unit 33, a loss calculation unit 34, and a parameter determination unit 35.

The training data acquisition unit 31 acquires, through the interface 13, the first training data stored in the first training data storage unit 21 and the first training data stored in the second training data storage unit 22, respectively. The training data acquired by the training data acquisition unit 31 may be all the training data held by the first training data storage unit 21 and the second training data storage unit 22, or may be a part thereof.

On the basis of the first training data and the second training data acquired by the training data acquisition unit 31, the identification score calculation unit 32 calculates a score (also referred to as "identification score S") indicating the degree of certainty that an object displayed in the image of the training data belongs to a registered category. At this time, the identification score calculation unit 32 configures the identifier by referring to the parameter information storage unit 23, and acquires the identification score S outputted from the identifier by inputting an image of the training data to the identifier. Details of the identification score S will be described later.

On the basis of the second training data acquired by the training data acquisition unit 31, the unregistered score calculation unit 33 calculates a score (referred to as an "unregistered score So") indicating the degree of certainty that an object displayed in the image of the training data does not belong to any of the registered categories. Details of the unregistered score So will be described later.

The loss calculation unit 34 calculates a loss (also referred to as "loss L") for the identification of a target object of the identification based on: the training data acquired by the training data acquisition unit 31; the identification score S calculated by the identification score calculation unit 32; and the unregistered score So calculated by the unregistered score calculation unit 33. Specifically, the loss calculation unit 34 calculates, as the loss L described above, a loss (also referred to as "first loss L1") for the identification score S which the identification score calculation unit 32 calculates based on the first training data and a loss (also referred to as "second loss L2") for the unregistered score So which the unregistered score calculation unit 33 calculates based on the second training data, respectively. The loss function to be used to calculate the loss L may be any loss function used in machine learning such as cross entropy and mean square error. The calculation method of the loss L will be described later.

The parameter determination unit 35 determines the parameters of the identification model for identifying the registered category based on the loss L calculated by the loss calculation unit 34. In this case, the parameter determination unit 35 determines the above-mentioned parameters so as to minimize the loss L calculated by the loss calculation unit 34. The algorithm for determining the above-described parameters so as to minimize the loss L may be any learning algorithm used in machine learning, such as a gradient descent method and an error back-propagation method. In this case, the parameter determination unit 35 determines the parameters so as to minimize the loss L calculated in consideration of the unregistered score So. Thus, the parameter determination unit 35 can train the identification model so that the outputted identification score for each of the registered categories is equal to or less than the threshold value (i.e., a reference value for rejecting the identification result) even when the display image of the unregistered category object is inputted to the learned identification model.

Further, in the example of FIG. 4, the parameter determination unit 35 stores the determined parameters in the parameter information storage unit 23, which is referred to by the identification score calculation unit 32 at the time of calculating the identification score S. Thus, in the example of FIG. 4, the parameter determination unit 35 performs the learning of the identification model to be used by the identification score calculation unit 32 for calculating the identification score S.

(3-2) Calculation Method of Identification Score

Next, a description will be given of a method for calculating the identification score S by the identification score calculation unit 32.

The identification score S is a value which indicates the degree of certainty that the target object of the identification displayed in the image of the training data inputted to the identification score calculation unit 32 belongs to each of the registration categories. The identification score S may be a probability value indicating the probability belonging to each registered category, or may be other values. The identification score S may be, for example, the output value of the Softmax function in which the sum of the outputs is adjusted to 1, or may be a log it to be used as the output of the final layer of the neural network, or may be an inner product value of the output vector and a reference vector predetermined for each category.

For example, a description will be given of the case of identification for three registration categories (classes) of dogs, cats, and birds, wherein the first training data in which the target object "dog" subjected to identification is displayed in the image is inputted to the identification score calculation unit 32. In this case, the identification score calculation unit 32 calculates the identification score S for each of the three registration categories of dogs, cats, and birds. At this time, the identification score calculation unit 32 may adjust the total value for the registered categories of dogs, cats, and birds (for example, "0.8", "0.15", and "0.05") to be 1. In another example, the identification score calculation unit 32 may calculate the identification score S for each of the registered categories corresponding to dogs, cats, and birds such that the maximum value becomes 1, and/or calculate the identification score S that includes a negative value (e.g., "1.0", "0.5" "−0.2").

The above-described identification score S is only a specific example for explanation, and may be any expression as long as it indicates the degree of the certainty that the object belongs to each registered category. Further, in the example of the identification score S described above, for the sake of simplicity, the identification score S for a registered category is expressed to be a value which increases with the increase in the degree of the certainty regarding the registered category, but it may be expressed to be the reverse.

(3-3) Calculation Method of Unregistered Scores

Next, a description will be given of a method for calculating the unregistered score So of the unregistered score calculation unit 33. The unregistered score So is a numerical value indicating the degree of certainty that the target object of the identification displayed in the image of the training data inputted to the unregistered score calculation unit 33 does not belong to any of the registration categories. The unregistered score So may be a probability value indicating the probability that the object does not belong to any of the registered categories, or it may be other values.

For example, a description will be given of the case of identification for three registration categories (classes) of dogs, cats, and birds, wherein the second training data in which the object "person" to be identified is displayed in the image is inputted to the unregistered score calculation unit 33. In this case, the unregistered score calculation unit 33 calculates an unregistered score So (e.g., "0.8") which is a numerical value indicating the probability that the object does not belong to any of the three registered categories corresponding to dogs, cats, and birds. It is noted that the unregistered score So described above is only a specific example for the sake of simplicity, and that it may be any expression as long as it indicates the degree of the certainty that the object does not belong to any of the registered categories. In addition, in the example of the identification score S described above, for convenience, the unregistered score So increases with increasing certainty, but it may be expressed to be the opposite.

The unregistered score calculation unit 33 preferably calculates the unregistered score So based on at least a portion of the identification scores S for registered categories for the same training data. Specific examples (the first specific example to the sixth specific example) of the calculation method of the unregistered score So in this case will be described below.

According to the first specific example, the unregistered score calculation unit 33 calculates the unregistered score So based on the highest identification score S which is the maximum value among the identification scores S for all registered categories calculated for the image of the same training data. Specifically, the unregistered score calculation unit 33 calculates the unregistered score So based on the following equation (1).

$$S_{0,i} = t - \max_c S_{c,i} \qquad (1)$$

In the equation (1), "$S_{0,\,i}$" on the left side indicates the unregistered score So for the inputted training data with the index "i". Besides, "t" on the right side indicates an arbitrary constant, and may be, for example, 0 or 1 or other numerical values, and "$S_{c,\,i}$" on the right side indicates the identification score S for the registered category with the index "c" for the inputted training data with the index i.

According to the equation (1), unregistered score calculation unit 33 calculates the unregistered score So by subtracting the highest identification score S among the identification scores S of all the registered categories from a certain constant t. In this case, the lower the maximum value of the identification score S of the registered category is, the higher the unregistered score So becomes. It is noted that the calculation formula of the unregistered score So is not limited to the equation (1). For example, the unregistered score calculation unit 33 calculates the unregistered score So by using any other equation in which the unregistered score So decreases with the increase in the highest identification score S among the identification scores S of all the registered categories.

According to the second specific example, the unregistered score calculation unit 33 determines the unregistered score So to be a value obtained by reducing a candidate value of the unregistered score So based on a predetermined constant. For example, the unregistered score calculation unit 33 calculates the unregistered score So for the training data with the index i based on the following equation (2) using the constant "m" representing a margin.

$$S_{0,i} = t - \max_c S_{c,i} - m \quad (2)$$

In the equation (2), the unregistered score So is determined to be the value obtained by subtracting the constant m from the candidate value of the unregistered score So determined according to the equation (1). In this case, the unregistered score So determined according to the equation (2) is a certain amount smaller than the unregistered score So determined according to the equation (1). In this way, by reducing the unregistered score So, the loss L calculated by the loss calculation unit 34 is increased, and it is expected that, at the time of the learning of the identification model by the parameter determination unit 35, the effect of attempting to improve the unregistered score So is emphasized. It is noted that the unregistered score calculation unit 33 may use, as the calculation formula of the unregistered score So, any other equation in which the unregistered score is reduced by a certain amount as compared with the equation (1) instead of using the equation (2).

In the third specific example, the unregistered score calculation unit 33 calculates the unregistered score So based on the weighted sum of the identification scores S corresponding to the registered categories, wherein the weight of each identification score S is determined depending on the ranking of the magnitude of the each identification score S. For example, the unregistered score calculation unit 33 calculates the unregistered score So based on the following equations (3).

$$S_{0,i} = t - \frac{1}{Z}\sum_{k=1}^{N} a_k S_{c_k,i}, \; Z = \sum_{k=1}^{N} a_k \quad (3)$$

Here, "$C_k$" indicates the index of the registered category having the "k" (k=1, 2, ..., N) th highest identification score S. Besides, "N" indicates the total number of registered categories and "$a_k$" on the right side of the equations indicates the weight corresponding to the kth highest identification score S. Here, $a_k$ on the right side of the equations is set so that the higher the ranking of the magnitude of the identification score S is, the larger the weight on the identification score S becomes. Namely, it is set so that the following equation is satisfied:

$a_1 > a_2 > \ldots > a_N$

According to the equations (3), the unregistered score calculation unit 33 calculates the unregistered score So by subtracting the weighted sum of the identification scores S according to the ranking of the magnitude of each identification score S from the constant (t). In this case, the lower the magnitude of the highly ranked identification scores S is, the higher the unregistered score So becomes. It is noted that the unregistered score calculation unit 33 may use, as a calculation formula of unregistered score So, any other formula in which the unregistered score So increases with the decrease in the magnitude of highly ranked identification scores S, instead of using the equations (3).

According to the fourth specific example, the unregistered score calculation unit 33 determines the unregistered score So based on the combination of the second specific example and the third specific example. For example, the unregistered score calculation unit 33 determines the unregistered score So based on the following equations (4).

$$S_{0,i} = t - \frac{1}{Z}\sum_{k=1}^{N} a_k S_{c_k,i} - m, \; Z = \sum_{k=1}^{N} a_k \quad (4)$$

According to the equations (4), as in the second specific example, a constant m representing a margin is used, and the unregistered score So shown in the equation (4) becomes a constant amount smaller than the unregistered score So shown in the equations (3). It is noted that the unregistered score calculation unit 33 may use, as a calculation formula of unregistered score So, any other formula in which the unregistered score So is reduced by a certain amount as compared with the equations (3), instead of using the equations (4).

According to the fifth specific example, the unregistered score calculation unit 33 calculates the unregistered score So based on the product of the identification score S for each of the registered categories. For example, the unregistered score calculation unit 33 calculates the unregistered score So based on the following equation (5).

$$S_{0,i} = N \prod_{c=1}^{N} S_{c,i}^{\frac{1}{N}} \quad (5)$$

Here, "$S_{c,i}$" corresponding to the identification score S for each registered category satisfies the following equation.

$\Sigma_{c=1}^{N} S_{c,i} = 1$

According to the equation (5), the smaller the difference (variance) in the identification scores S of the registered categories is, the higher the unregistered score So becomes, wherein the unregistered score So becomes the maximum value when the identification score S of each registered category is all equal. It is noted that the unregistered score calculation unit 33 may use, as a calculation formula of the unregistered score So, any other formula such that the same effect can be obtained, instead of using the equation (5).

According to the sixth specific example, the unregistered score calculation unit 33 calculates the unregistered score So using parameters for adjusting the degree of variation in the unregistered score So. Specifically, the unregistered score calculation unit 33 calculates the unregistered score So based on the following equation (6).

$$S_{0,i} = N \prod_{c=1}^{N} S'^{\frac{1}{N}}_{c,i}, \; S'_{c,i} = \frac{\exp(t \cdot \phi_{c,i})}{\sum_{j=1}^{N} \exp(t \cdot \phi_{j,i})} \quad (6)$$

In the equation (6), "$\varphi_{j,i}$" indicates the output value of the final layer of the neural network corresponding to the registered category with the index "j" for the inputted training data with the index i. Besides, "t" is a constant greater than 1, and the larger the constant t is, the more emphasized difference in the output value $\varphi_{j,i}$ for each registered category is reflected in the identification score "$S'_{c,i}$". Namely, the greater the constant t is, the less the variance (difference) in the identification score $S'_{c,i}$ for each registered category is likely to be small and therefore the less the unregistered score So is likely to fall. It is noted that the unregistered score calculation unit 33 may use, as a calculation formula of unregistered score So, any other formula such that the same effect can be obtained, instead of using the equation (6).

$$S_{0,i} = \frac{\exp(t \cdot (1-m))}{\sum_{j=1}^{N} \exp(t \cdot \phi_{j,i}) + \exp(t \cdot (1-m))} \quad (6A)$$

In the equation (6A), "$\varphi_{j,i}$" indicates the output value of the final layer of the neural network corresponding to the registered category with the index "j" for the inputted training data with the index i. Besides, "t" is an arbitrary constant, and "m" is an arbitrary constant. According to the equation (6A), the smaller $\varphi_{j,i}$ is, the larger "$S_{o,i}$" becomes. At this time, the maximal value of "$S_{o,i}$" is 1. When "$\varphi_{j,i}$" is constant, the larger the constant "m" is, the smaller the "$S_{o,i}$" becomes.

(3-4) Method of Calculating Loss

The loss calculation unit 34 calculates the loss L based on: the training data acquired by the training data acquisition unit 31; the identification score S calculated by the identification score calculation unit 32; and the unregistered score So calculated by the unregistered score calculation unit 33.

Here, the loss calculation unit 34 calculates the loss L based on: the first loss L1 for the identification score S calculated based on the first training data; and the second loss L2 for the unregistered score So calculated based on the second training data. For example, the loss calculation unit 34 calculates the loss L by using an arbitrary coefficient "a", based on the following equation (7).

$$L = L1 + \alpha \cdot L2 \quad (7)$$

Here, the loss calculation unit 34 calculates the first loss L1 using the identification score S and the label information (i.e., correct answer information) included in the first training data acquired by the training data acquisition unit 31, wherein the identification score calculation unit 32 calculates the identification score S based on the above-mentioned first training data. The first loss L1 is, for example, the output value of a loss function such as cross entropy commonly used in a deep learning. The first loss L1 is determined so that the first loss L1 decreases with increase in the identification score S for the correct-answer category of the registered category object indicated by the label information.

The loss calculation unit 34 calculates the second loss L2 using the identification score S and the unregistered score So, wherein the identification score S is calculated by the identification score calculation unit 32 based on the second training data acquired by the training data acquisition unit 31 and the unregistered score So is calculated by the unregistered score calculation unit 33 based on the above-mentioned second training data. For example, the loss calculation unit 34 calculates the second loss L2 based on the following equation (8).

$$L2 = \frac{1}{M} \sum_{i=1}^{M} L2_i \quad (8)$$

"$L2_i$" denotes a second loss L2 for the second training data with the index "i", and "M" denotes the total number of the second training data entered. Then, the loss $L2_i$ is calculated according to the following equations (9) and (10).

$$L2_i = -\log(p_i) \quad (9)$$

$$p_i = \frac{\exp(s \cdot S_{0,i})}{\sum_{c=1}^{N} \exp(s \cdot S_{c,i}) + \exp(s \cdot S_{0,i})} \quad (10)$$

Here, "s" is an arbitrary constant. By using the equation (8) to the equation (10), the loss calculation unit 34 calculates the second loss L2 so that the second loss L2 decreases with increase in the unregistered score So. It is noted that the loss calculation unit 34 may use any formula other than the above equations so as to reduce the second loss L2 with increasing unregistered score So.

(3-5) Training Data

Here, a supplementary description will be given of the second training data stored in the second training data storage unit 22. The second training data stored in the second training data storage unit 22 may be, for example, an image which displays an object similar to an unregistered category object that is assumed to possibly exist when the identifier learned by the learning device 10 performs identification. A description will be given of a specific example of identifying three classes of "commodity A," "commodity B," and "commodity C" as registration categories using the above-described identifier. In this case, when objects belonging to the categories "human hand", "part of western clothes", and "purse" are similar objects of an unregistered category object that can be assumed, the second training data stored in the second training data storage unit 22 may be an image displaying an object belonging to each of these categories.

In another example, the second training data included in the second training data storage unit 22 may be a large amount of landscape images or images each of which displays random object(s) other than registered category objects. In still another example, the second training data may include images taken of landscapes and objects that may be background or noise in the environment to which the identifier described above is applied.

(3-6) Processing Flow

Figure 5:
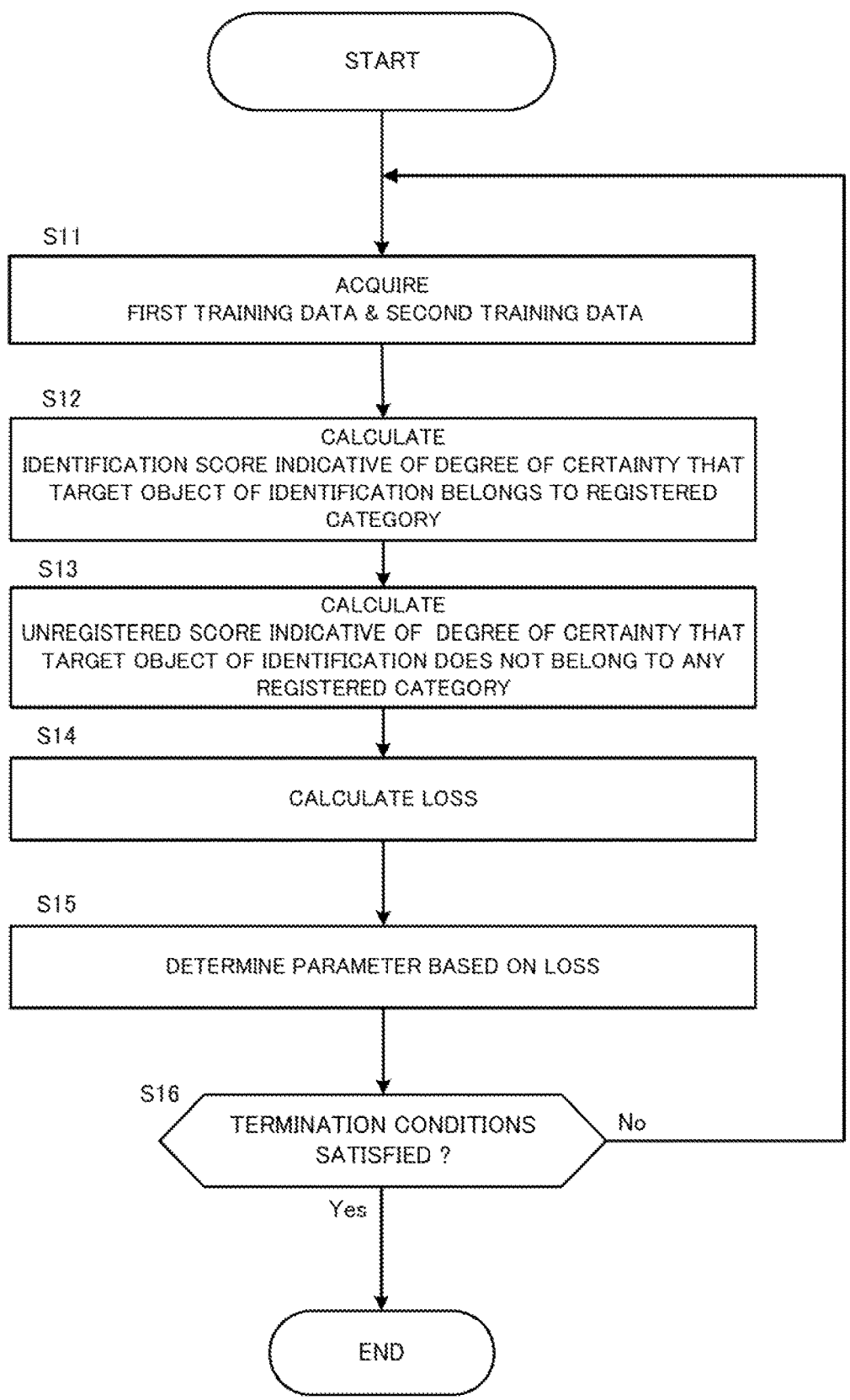
FIG. 5 illustrates an example of a flowchart showing the process flow relating to the learning.

FIG. 5 is an example of a flowchart illustrating a flow of the process related to learning by the learning device 10.

First, the training data acquisition unit 31 of the learning device 10 acquires the first training data from the first training data storage unit 21 and acquires the second training data from the second training data storage unit 22 (step S11).

Next, on the basis of the first training data and the second training data acquired at step S11, the identification score calculation unit 32 calculates the identification score S indicating the degree of certainty that an object (i.e., an object to be identified) displayed in the image of the training data belongs to each of the registered categories (step S12). Further, on the basis of the second training data acquired at step S11, the unregistered score calculation unit 33 calculates the unregistered score So indicating the degree of certainty that the object displayed in the image of the training data does not belong to any of the registered categories (step S13). At this time, for example, the unregistered score calculation unit 33 calculates the unregistered score So based on any one of the equations (1) to (6) using the identification score S calculated by the identification score calculation unit 32 from the second training data.

Next, the loss calculation unit 34 calculates the loss L based on the identification scores S calculated at step S12 and the unregistered score So calculated at step S13 (step S14). In this case, the loss calculation unit 34 calculates the first loss L1 based on the identification scores S calculated by the first training data and the label information included in the above-mentioned first training data. Further, the loss calculation unit 34 calculates the second loss L2 based on the identification scores S and the unregistered score So which are calculated by the second training data, for example, by referring to the above-described equations (8) to (10). Then, for example, the loss calculation unit 34 calculates, using the coefficient α, the loss L based on the equation (7) from the first loss L1 and the second loss L2. Then, on the basis of the loss L calculated at step S14, the parameter determination unit 35 determines parameters to be stored in the parameter information storage unit 23 (step S15).

Then, the learning device 10 determines whether or not the termination conditions of the learning is satisfied (Step S16). The learning device 10 may make the determination of whether or not the termination conditions of the learning is satisfied at step S16 by determining whether or not the number of execution of loops has reached a predetermined number set in advance, or by determining whether or not the learning has been executed for a preset number of training data. In another example, the learning device 10 may make the determination of whether or not the termination conditions of the learning is satisfied at step S16 by determining whether or not the loss L has fallen below a preset threshold value, or by determining whether or not the variation in the loss L has fallen below a preset threshold value. It is noted that the determination of whether or not to terminate the learning at step S16 may be a combination of the above-described examples, or may be according to any other determination approach.

In this way, the learning device 10 performs the learning of the identification model based on both the identification score S and the unregistered score So. Thereby, the learning device 10 can suitably obtain the parameters of such an identification model that correctly identifies a registered category object while correctly rejecting the unregistered category object. It is noted that, in the object recognition process using such a learned identification model (identifier), a reject process configured to reject an identification result whose identification score outputted by the identifier is smaller than a set threshold is suitably applied. Here, the above-mentioned identifier is learned to output a low identification score for any registered category when an image in which an unregistered category object is displayed is inputted. Therefore, by applying the above-described reject process to the output of the above-described identifier, it is possible to suitably suppress the unregistered category object from being erroneously recognized as an object belonging to any of the registered categories in the object recognition process.

Second Example Embodiment

Figure 6:
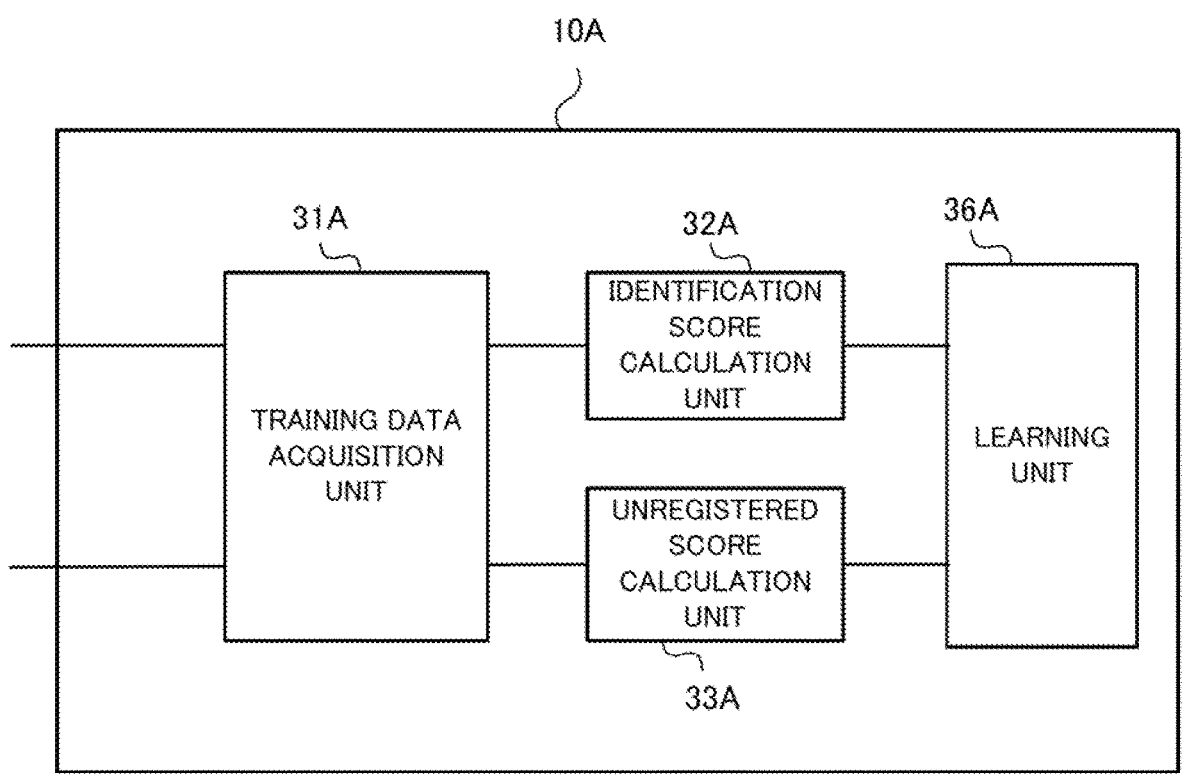
FIG. 6 illustrates a schematic configuration of a learning device according to the second example embodiment.

FIG. 6 shows a schematic configuration of a learning device 10A according to a second example embodiment. The learning device 10A includes a training data acquisition unit 31A, an identification score calculation unit 32A, an unregistered score calculation unit 33A, and a learning unit 36A.

The training data acquisition unit 31A acquires first training data regarding a registered category object and second training data regarding an unregistered category object, the registered category object belonging to a registered category which is registered as an identification target, the unregistered category object not belonging to the registered category.

The identification score calculation unit 32A calculates, on the basis of the first training data and the second training data, an identification score S indicating a degree of certainty that an object to be identified (i.e., an object displayed by the target training data) belongs to the registered category. The unregistered score calculation unit 33A calculates, on the basis of the second training data, an unregistered score So indicating a degree of certainty that an object (i.e., an object displayed by the target training data) to be identified does not belong to the registered category.

The learning unit 36A learns an identification model which performs an identification regarding the registered category based on the identification score S calculated by the identification score calculation unit 32A and the unregistered score So calculated by the unregistered score calculation unit 33A. The learning unit 36A includes, for example, a loss calculation unit 34 and a parameter determination unit 35 illustrated in FIG. 4.

According to this configuration, the learning device 10A learns the identification model that performs identification regarding the registered category based on both the identification score S and the unregistered score So. Thus, the learning device 10A can suitably obtain the parameters of the identification model which correctly identifies registered category objects while accurately rejecting unregistered category objects.

The whole or a part of the example embodiments described above (including modifications, the same applies hereinafter) can be described as, but not limited to, the following Supplementary Notes.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All patent and Non-Patent Literatures mentioned in this specification are incorporated by reference in its entirety.

DESCRIPTION OF REFERENCE NUMERALS 10, 10A learning device
11 Processor
12 Memory
13 Interface
20 Storage device
21 First training data storage unit
22 Second training data storage unit
23 Parameter information storage unit
100 Learning system

What is claimed is:
1. A learning device comprising a processor configured to:
acquire first training data that is training data regarding a registered category object and second training data regarding an unregistered category object, the registered category object belonging to a registered category which is registered as an identification target, the unregistered category object not belonging to the registered category;
calculate, on a basis of the first training data and the second training data, an identification score indicating a degree of certainty that an object to be identified belongs to the registered category;

calculate, on a basis of the second training data, an unregistered score indicating a degree of certainty that the object to be identified does not belong to the registered category; and learn an identification model which performs an identification regarding the registered category based on the identification score and the unregistered score.

2. The learning device according to claim 1, wherein the processor is configured to calculate the unregistered score based on the identification score calculated based on the second training data.

3. The learning device according to claim 2, wherein the processor is configured to calculate the unregistered score based on the identification score that is the maximum among the identification score calculated for each registration category.

4. The learning device according to claim 2, wherein the processor is configured to calculate the unregistered score based on
- a sum of the identification score calculated for each registered category or
- a weighted sum of the identification score calculated for each registered category weighted based on a ranking of a magnitude of the identification score.

5. The learning device according to claim 2, wherein the processor is configured to calculate the unregistered score based on a product of the identification score calculated for each registered category.

6. The learning device according to claim 1, wherein the processor is configured to determine the unregistered score to be a value obtained by decreasing a candidate value of the unregistered score based on a constant.

7. The learning device according to claim 1 wherein the processor is configured, in learning the identification model to:
    calculate
        a first loss that is a loss for the identification score calculated from the first training data and
        a second loss that is a loss for the unregistered score calculated from the second training data; and
    determine a parameter of the identification model based on the first loss and the second loss.

8. The learning device according to claim 1, wherein the processor is configured to perform the learning of the identification model which is used for calculating the identification score.

9. A learning method comprising:

acquiring first training data that is training data regarding a registered category object and second training data regarding an unregistered category object, the registered category object belonging to a registered category which is registered as an identification target, the unregistered category object not belonging to the registered category;

calculating, on a basis of the first training data and the second training data, an identification score indicating a degree of certainty that an object to be identified belongs to the registered category;

calculating, on a basis of the second training data, an unregistered score indicating a degree of certainty that the object to be identified does not belong to the registered category; and learning an identification model which performs an identification regarding the registered category based on the identification score and the unregistered score.

10. A non-transitory computer readable storage medium storing a program executed by a computer, the program causing the computer to:

acquire first training data that is training data regarding a registered category object and second training data regarding an unregistered category object, the registered category object belonging to a registered category which is registered as an identification target, the unregistered category object not belonging to the registered category;

calculate, on a basis of the first training data and the second training data, an identification score indicating a degree of certainty that an object to be identified belongs to the registered category;

calculate, on a basis of the second training data, an unregistered score indicating a degree of certainty that the object to be identified does not belong to the registered category; and learn an identification model which performs an identification regarding the registered category based on the identification score and the unregistered score.

* * * * *